July 4, 1967 A. W. HEWITT 3,328,925
PROCESS FOR ORNAMENTING GLASS ARTICLES
Filed June 17, 1965 5 Sheets-Sheet 1

INVENTOR.
ARTHUR W. HEWITT
BY
Benjamin Sweedler
ATTORNEY

FIG. 5
FIG. 6
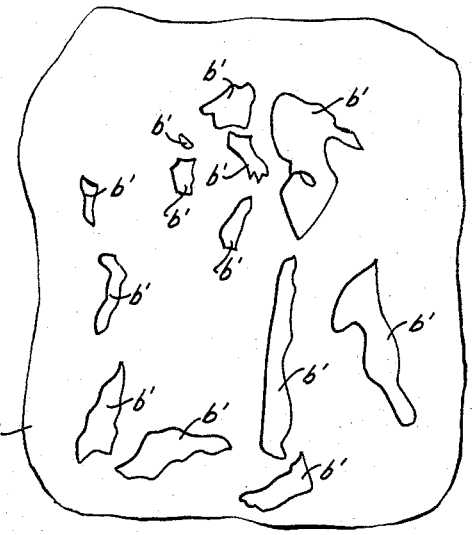
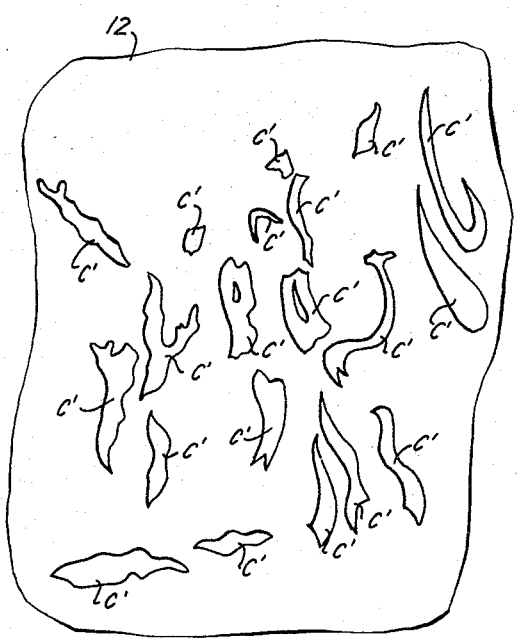
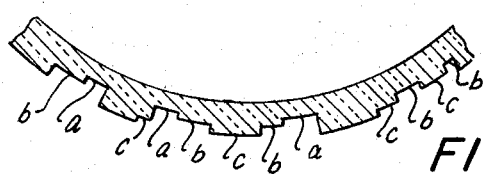
FIG. 7
FIG. 8
FIG. 9
INVENTOR.
ARTHUR W. HEWITT
BY
ATTORNEY

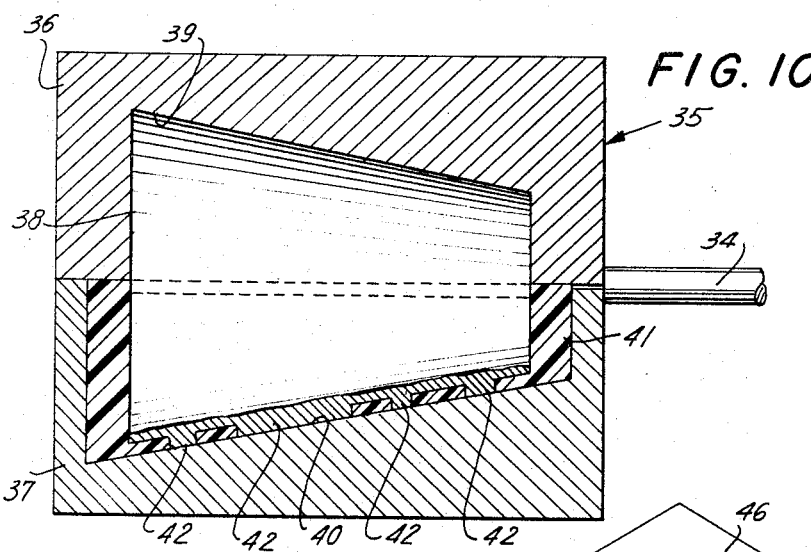
FIG. 10
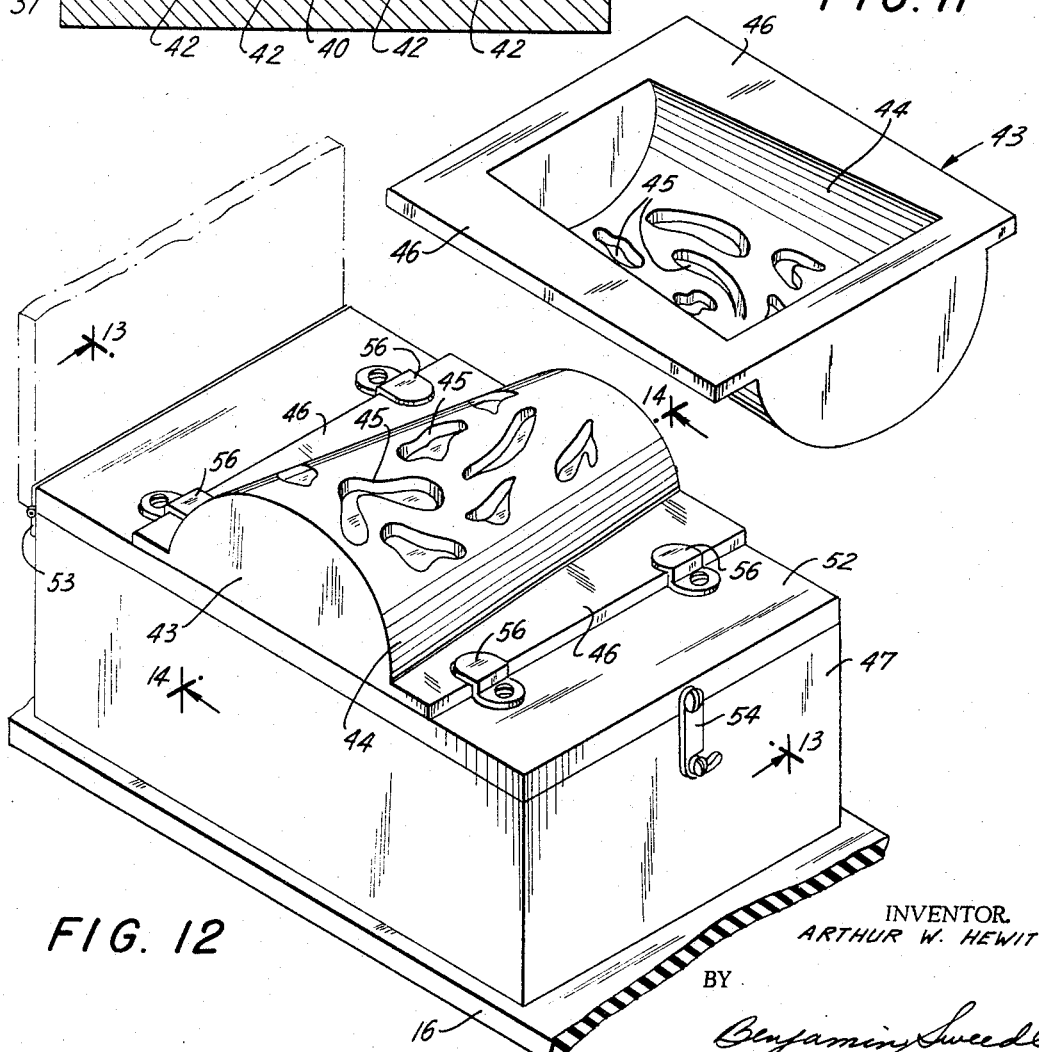
FIG. 11
FIG. 12

INVENTOR.
ARTHUR W. HEWITT
BY
Benjamin Sweedler
ATTORNEY

United States Patent Office 3,328,925
Patented July 4, 1967

3,328,925
PROCESS FOR ORNAMENTING GLASS ARTICLES
Arthur W. Hewitt, Santa Monica, Calif., assignor to John M. Exton as trustee of the trust known as Exton Development Company
Filed June 17, 1965, Ser. No. 480,538
(Filed under Rule 47(b) and 35 U.S.C. 118)
6 Claims. (Cl. 51—312)

This application is a continuation-in-part of patent application Ser. No. 133,387, filed Aug. 23, 1961, now abandoned, which application is in turn a continuation-in-part of patent application Ser. No. 32,440, filed May 27, 1960, now abandoned.

This invention relates to the formation of three-dimensional gravings or bas-relief sculpturing on glass, particularly glass articles, such as drinking glasses, containers, bottles, decanters, goblets and the like.

It is a principal object of this invention to provide a process for graving or sculpturing three-dimensional bas-relief designs on glass articles, which process produces ornamented glass articles having designs thereon of unusual attractiveness and appearance and is capable of being efficiently carried out on a mass production basis at a relatively low cost per article.

Another object is to provide a process for graving or sculpturing three-dimensional bas-relief designs on glass articles, which designs have selected areas thereof abraded from the glass in varying depths and presenting frosted surfaces of varying characteristics so that the several areas of the ornamental design are distinguishable from each other both by the depth and surface characteristics thereof to produce unusually attractive designs.

In accordance with this invention, each glass article to be provided with an ornamental design is exposed to a plurality of successive design-forming steps during which it is blasted with finely divided abrasive particles, such as Carborundum, under successively decreasing blasting pressures and preferably for successively decreasing predetermined time intervals, respectively. The surface of each article is shielded or masked against the effect of the blast of abrasive particles during each blasting step with the exception of selected exposed areas of the surface corresponding to portions of the ornamental design to be formed. The selected areas which are exposed during each blasting step of the process include substantially all of the areas exposed during the preceding step or steps, so that the various selected areas of the surface are abraded to different depths and have different surface characteristics to define a unique design of unusual attractiveness.

In accordance with one embodiment of the invention, each article is covered with a shield masking the entire area of the ornamental design to be placed thereon, and the shield is precut, or otherwise initially formed, so as to permit the pulling out or removal of portions of the shield corresponding to selected areas of the desired design. The glass articles thus masked with the shields are conveyed repeatedly through a blasting station, or through a succession of blasting stations, at each of which the masked article is blasted with finely divided abrasive particles under a predetermined pressure and for a predetermined time interval, with selected areas of portions of each shield being pulled out or removed prior to each passage of the article through a blasting station. The successive blastings are under decreasing pressures and preferably for decreasing time intervals.

In another embodiment of the invention, each of the successive blasting steps of the process is carried out with the surface of the article masked by a different shield having openings therein corresponding to those areas of the surface which are then to be exposed to the effect of the blasting with the abrasive particles. In practicing this embodiment of the invention, the articles may be transported by a single conveyor through a plurality of successive blasting stations, at each of which the surface of each article is masked by a shield having openings therein for exposing the corresponding selected surface areas of the article to the effect of the blasting with abrasive particles; or the articles may be successively transferred from one to another of a plurality of conveyors each of which carries the articles through a blasting station, with the shields individual to that conveyor masking the glass articles carried thereby. In both cases the speed of the conveyor is correlated with the blasting to provide for successive blastings of decreasing time intervals. The blasting is carried out under pressure conditions so that each particle is subjected to successive blastings of decreasing pressure; the first blasting is at a higher pressure and for the longest time interval, produces cut areas which are deepened by the subsequent blasting steps, and hence are the deepest cut areas. The subsequent blastings produce the areas of less depth. All of these areas have shades of frosting which contrast with each other and with the clear transparent areas of the glass. As noted, the subsequent blastings deepen the areas produced by the preceding blastings, and the last blasting step produces fresh shallow blasted areas of the design contrasting with the clear glass as well as with the deeper design areas.

The above and other objects, features and advantages of the invention will be apparent from the following detailed description of illustrative embodiments thereof which is to be read in connection with the accompanying drawings, forming a part hereof, and where:

FIGURE 1 is a perspective view of a glass article to be ornamented and of a shield which is used in producing such design in accordance with one embodiment of the invention;

FIGURE 1a is a transverse section through the shield to show the laminar construction;

FIGURE 2 is a perspective view showing the shield applied to the glass article of FIGURE 1, and with selected portions of the shield to be successively pulled out or removed therefrom;

FIGURE 3 is a schematic view illustrating successive steps of the process for forming glass articles with ornamental designs when employing shields of the kind illustrated in FIGURES 1 and 2;

FIGURE 4 is a perspective view of an apparatus that can be used in performing each of the blasting steps of the process illustrated in FIGURE 3;

FIGURES 5, 6 and 7 are views illustrating those portions of the shield of FIGURES 1 and 2 which are successively pulled out or removed prior to the successive blasting steps of the process in accordance with the embodiment of FIGURE 3;

FIGURE 8 is a perspective view of the glass article of FIGURE 1 with the completed ornamental design formed therein;

FIGURE 9 is a fragmentary sectional view of the glass article of FIGURE 8 illustrating the varying depths of the design formed therein;

FIGURE 10 is a sectional view of a mold in which a shield is formed for masking glass articles during the production of an ornamental design in the latter in accordance with another embodiment of this invention;

FIGURE 11 is a perspective view of a shield formed in the mold of FIGURE 10;

FIGURE 12 is a perspective view of a support carrying the shield of FIGURE 11 and within which a glass article is mounted so as to have selected areas of its surface exposed through openings of the shield while the glass article is transported by a conveyor;

Figure 13:
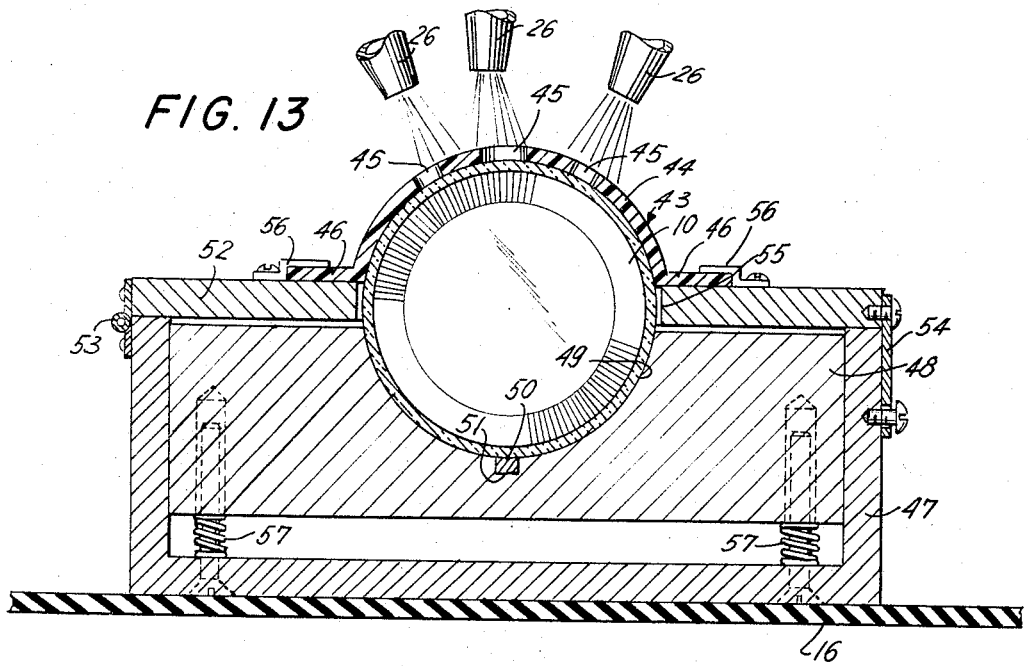
FIGURE 13 is a sectional view taken along the line 13—13 on FIGURE 12.

Referring to the drawings in detail, there is shown in FIGURE 1 a glass article, in the form of a tumbler or goblet 10 in which a three-dimensional, bas-relief design is to be graved or sculptured, for example, the design indicated generally by the reference numeral 11 on FIGURE 8. The graved or sculptured design 11 is made up of abraded surface areas $a$, $b$ and $c$ having increasing depths, as is apparent in FIGURE 9, and also having different surface characteristics, as hereinafter described in detail. The various depths and surface characteristics of the areas making up the total design contribute to the three-dimensional or bas-relief effect of the design and its unusual attractiveness. Areas $a$ are the areas of greatest depth, $b$ of intermediate depth and $c$ of least depth. It will be appreciated that the design can have two or more areas of different depths and surface characteristics and this invention is not confined to the three-depth design shown for illustrative purposes.

In accordance with one embodiment of this invention, a graved or sculptured design of the type shown in FIGURE 8 by way of illustration is provided on a glass article, for example, the tumbler or goblet 10, by masking the surface of the article 10 with a shield 12 which may be in the form of a flexible sheet of laminated construction initially including an uncut backing sheet 12a, a body sheet 12b having a coating of pressure-sensitive adhesive 12c on its back surface covered by the backing sheet 12a. The front surface of the body sheet 12b has a protective coating 12d of a material resistant to abrasion from blasting with finely divided abrasive particles, for example, Teflon varnish, nylon varnish or rubber latex. The body sheet 12b can be a good grade of paper having high tensile strength to resist tearing, while the backing sheet 12a is formed of a thin sheet of paper of sufficiently low porosity to avoid drying out of the adhesive which initially secures the backing sheet 12a to the body sheet 12b.

The body sheet 12b and the surface coating 12d of the shield has the design 11 cut therein, preferably die cut, with the various areas $a$, $b$ and $c$ thereof outlined by cuts extending through the surface or protective coating 12d and body sheet 12b into the adhesive layer 12c, but not into the backing sheet so as to leave the latter intact. The backing sheet and the pressure-sensitive adhesive maintain the die cut areas in place. The areas, however, can readily be removed successively by the operator by the application of a suitable picking tool or by hand after the backing sheet 12a is removed.

While ornamenting a glass article by the process employing the above described shield 12, the backing sheet 12a is initially stripped from the body sheet of the shield which is then laid upon the surface of the glass article 10 and adhered to the latter by the pressure-sensitive adhesive 12c on the back surface of the body sheet. The operator then removes those areas or portions of the pre-cut shield corresponding to the areas $a$ of the design 11 on FIGURE 8, so that the shield has the openings $a'$ shown on FIGURE 5 to expose the corresponding underlying areas of the surface of the glass article. A shield 12 is preferably placed on each glass article 10 while the latter is transported by a first conveyor 13 (FIGURE 3) having suitable pockets for receiving the glass articles with the portions of the surfaces thereof which are to be ornamented facing upwardly. The removal of the initial portions or areas of each shield to define the openings indicated at $a'$ on FIGURE 5 can be effected just before the glass article is placed on the conveyor 14 or during transport of the articles on conveyor 13.

After removal of the first series of pull-outs from the shields masking the glass articles 10, the latter are transferred to a conveyor 14 which is operative to transport the glass articles through a first blasting station (FIGURE 3). As shown in FIGURE 4, the conveyor 14 includes an endless flexible belt 16 having spaced apart pockets 17 therein congruent with the glass articles to receive the glass articles and running around pulleys 18 that are journalled in bearings 19 carried by a frame 20 and driven by a motor 21 so that belt 16 moves along substantially horizontal upper and lower runs. The upper run of belt 16 passes through a housing 22 defining the blasting station and having flap doors 23 which substantially close inlet and outlet openings provided for passage of the belt therethrough. Housing 22 further preferably has a movable closure 24 at one side thereof which is shown in its open position and which includes a window 25 through which the progress of the blasting operation within housing 22 may be conveniently observed. A number of nozzles 26 are adjustably supported within housing 22 above the upper run of belt 16 and are connected by flexible hoses 27 and 28 to sources of air under pressure and of finely divided abrasive particles, respectively, so that each nozzle 26 is adapted to emit a jet or blast of finely divided abrasive particles under pressure. Suitable controls (not shown) are provided for operating the conveyor 14, and also for controlling the emission of blasts of abrasive particles from the nozzles 26. The nozzles 26 are arranged in pairs. The middle pair 26a projects substantially directly downwardly, the end pair 26b projects at an acute angle to the horizontal plane of the upper run of the conveyor in the direction of movement of the conveyor. The pair 26c project sprays toward the sides of each article as it rests on the conveyor. Thus all exposed areas are effectively blasted, producing a frosted appearance in the exposed areas. It is important that a multiplicity of blasts be used directed downwardly as well as at acute angles to the horizontal. A downwardly directed blast alone will not produce the desired effect. It is the combination of both types of blasts that gives the pleasing frosted appearance to the cut or abraded areas.

During the time that each glass article 10 having a shield 12 applied thereto resides within the housing 22 which defines the first blasting station 15, the article is subjected to compound blasts of finely divided abrasive particles from nozzles 26, as hereinbefore described, which abrade those areas of the surface of the glass article exposed through the openings of shield 12 indicated at $a'$ on FIGURE 5 to produce the frosted, or dulled out or abraded surfaces.

At the conclusion of the first blasting step of the process, conveyor 16 carries the glass articles out of housing 22, whereupon the operator removes additional portions of each shield 12 corresponding to the areas $b$ of the design 11 on FIGURE 8, so that the shield then presents the openings $b'$ indicated on FIGURE 6, which openings expose the selected corresponding underlying areas of the glass article as well as the previously exposed areas corresponding to the openings $a'$ of FIGURE 5.

After such further removal of pull-outs or portions of each shield 12, the articles are either again transported through housing 22 on conveyor 14, or transferred to another similar conveyor 29 (FIGURE 3) by which the articles are transported through a second blasting station 30, similar to the first. At such second blasting station 30, the successive articles with the shields applied thereto are again subjected to compound blasting with finely divided abrasive particles, as hereinabove described, so that the areas thereof exposed through the openings indicated at $b'$ on FIGURE 6 as well as openings $a'$ (FIGURE 5) are exposed to the abrading action to produce the desired frosted portions of the design.

After removal from the second blasting station 30 by the conveyor 29, the pull-outs or portions of the shield on each glass article corresponding to the areas of the design indicated at $c$ on FIGURE 8 are removed from each shield so that the latter then defines the openings indicated at $c'$ on FIGURE 7 as well as openings $b'$ (FIGURE 6) and $a'$ (FIGURE 5), i.e., the complete design defined by the total of all of those portions or pull-outs of shield 12 which have now been removed. Then the successive glass articles are transported through a third blasting station 31 (FIGURE 3) either on the same conveyor or on a further conveyor 32 to which the glass articles are transferred. At such third blasting station 31, the newly exposed areas of each glass article exposed through the openings of its shield indicated at $c'$ on FIGURE 7 as well as the areas previously exposed are subjected to blasting, as hereinabove described, with finely divided abrasive particles.

After the successive articles have been removed by conveyor 32 from the third blasting station 31, the shields 12 are removed from the glass articles and the latter are sprayed with a cleansing solution or otherwise cleansed, either while the articles are being transported by the same conveyor 32 or following the manual transfer of the articles to a further conveyor 33 (FIGURE 3).

It will be apparent that substantially all of the areas $a$ of design 11 in FIGURE 8 are defined by abrading of the corresponding surface portions of glass article 10 during all three of the blasting steps of the process, whereas substantially all of the areas $b$ of the design are defined by abrading of the glass during the second and third blasting steps and the areas $c$ are defined by abrading of the glass only during the third or last blasting step. Thus, as is apparent in FIGURE 9, the areas $a$, $b$ and $c$ of the design 11 are abraded to progressively decreasing depths, and further have different surface characteristics which are determined by the intervals of time during which the respective areas have been exposed to the blasting with finely divided particles of abrasive as well as the pressures employed in the successive blasting steps.

In accordance with the invention, the successive steps of blasting with finely divided abrasive particles are at progressively decreasing pressures and preferably also of decreasing time periods respectively. In a preferred example of this invention, the abrasive material employed for all three graving or blasting steps consists of Carborundum particles of a particle size such that substantially all of the particles pass through a 110-mesh screen; the average size of the longest dimension of such particles is approximately 125 microns. The first graving or blasting step blasts the masked articles with such abrasive particles under a pressure of from 30 to 40 pounds per square inch gauge for a time interval of from 10 to 20 seconds duration. The second graving or blasting step of the process is preferably carried out under a pressure of from 10 to 15 pounds per square inch gauge and for a time interval of from 3 to 10 seconds, and the third graving or blasting stage employs a pressure of from 3 to 8 pounds per square inch gauge for a time interval of from 1 to 5 seconds. In general, the first steps should be carried out at a pressure of from 30 to 40 p.s.i.g. for from 10 to 20 seconds and the last under a pressure of from 3 to 8 p.s.i.g. for from 1 to 5 seconds. Where more than two blasting steps are used, the pressures and time intervals of the intermediate steps should be between these values. Operating under these conditions of pressure and time, using Carborundum or other hard abrasive particles of the approximate sizes indicated and employing a series of blasts directly downwardly and at inclined angles as hereinabove described, the unusual, pleasing frosted effects are obtained.

Moreover, by reason of the progressively decreasing durations and pressures of the successive graving or blasting steps, the design areas $a$, $b$ and $c$ are not only of progressively decreasing depth, but also have pitted or frosted surfaces of progressively decreasing roughness, so that marked, pleasing contrast appears between the several areas making up the design, sharply and attractively delineating the respective portions thereof.

Although the above described process involves three successive blasting steps, it will be appreciated that any desired number of such steps, two or more, may be used, and that each succeeding blasting step, in addition to effecting the graving of its respective design areas, effects the deepening and changing of the surface characteristics of the design areas produced by the preceding step or steps.

In the above described embodiment of the invention, each glass article 10 has had a single shield 12 adhered to the surface thereof during the entire process by which the three-dimensional, bas-relief design is produced in the surface of the glass article, and the additional surface areas exposed during the successive blasting steps have been defined by removing portions of that one shield. However, it is to be understood that, in accordance with the present invention, the areas of each glass article exposed during the successive blasting steps may be defined by different shields associated with glass articles during the successive blasting steps and having suitably shaped openings formed therein.

FIGURE 10 of the drawings shows a mold for forming a shield of plastic material, which plastic material is self-supporting. Any suitable heat-setting plastic, resistant to wear under the blasting pressures used, may be employed. The rubbers, synthetic or natural, or the flexible plastics such as polyethylene or polypropylene containing fillers to impart body can be used.

The plastic may be injected through a filling tube 34 or otherwise introduced into a mold 35 having separable upper and lower portions 36, 37 and a core 38 which can be a glass article the same as those to be ornamented. The core fits closely within the cavity 39 of the upper mold portion 36. The cavity 40 of the lower mold portion 37 is generally larger than the portion of the core 38 extending therein so as to provide a clearance therebetween, which may be filled with the plastic material 41.

After the plastic material has been introduced into the lower mold portion 37 in liquid condition, the core 38 or a glass article of the same configuration as that to be ornamented, but having secured to its surface projections 42 by cementing or otherwise corresponding to the openings 45 forming the selected portions of the design, is placed in the mold and the upper portion 36 applied to exert pressure on the core 38 or glass article. This causes the liquid plastic to flow into the flange areas forming the flanges 46 on the sides and also produces the design openings 45 in the shield.

When the molded shield 43 (FIGURE 11) thus produced has set and is removed from mold 35, the wall 44 of the shield has the desired openings 45 therein corresponding to the openings $a'$, $b'$ or $c'$ of FIGURES 4, 5 and 7, as the case may be. One shield is produced with openings $a'$, another with openings $b'$ and a third with openings $c'$, the core or glass article employed for producing each shield having projections thereon to form the desired arrangement of openings in the shield.

Figure 14:
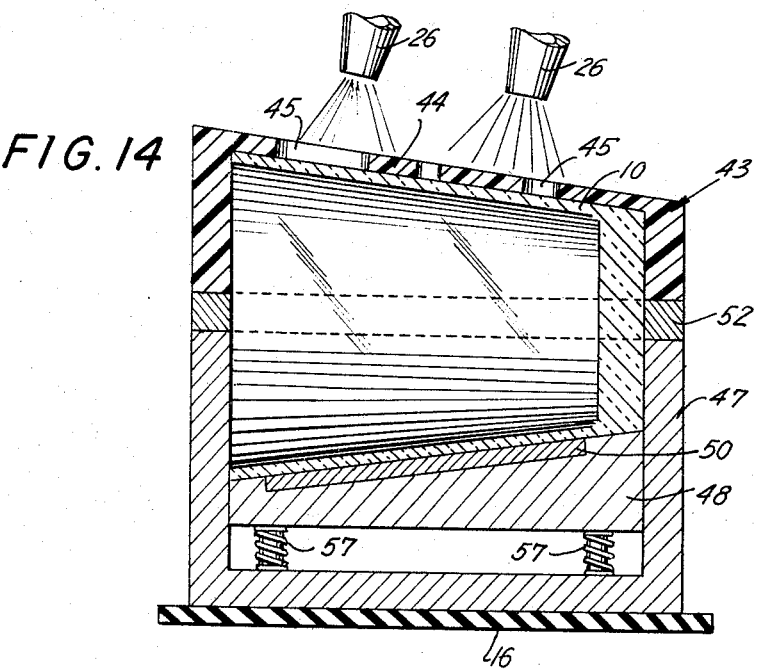
FIGURE 14 is a sectional view taken along the line 14—14 on FIGURE 12.

In using shields produced in the manner described above with reference to shield 43, a series of support boxes 47 are suitably secured, at spaced apart locations, on a conveyor belt, for example, the belt 16 of the apparatus illustrated in FIGURE 4. Each box contains a mounting block 48 which is vertically movable therein and formed with an upwardly opening recess or seat 49 shaped to receive a glass article 10. Preferably, each glass article 10 has a key or other locating member 50 adhesively, or otherwise removably secured to its outer surface and adapted to be received in a correspondingly shaped slot 51 formed at the bottom of seat 49 so that each glass article will be identically located and fixed in the boxes 47 associated with the conveyor 16. Each box 47 further has a lid or cover 52 hinged thereon, as at 53, to permit swinging of the lid between the closed position shown in full lines on FIGURES 12, 13 and 14 and the open position represented by the broken lines on FIGURE 12. A suitable latch 54 is provided on lid 52 for holding the latter in its closed position. Lid 52 further has an opening 55 therein (FIGURE 13) which is located above seat 49 in the closed position of the lid and which is dimensioned to permit the glass article 10 received in seat 49 to extend through opening 55 above lid 52. A shield 43 is secured on lid 52 above opening 55, for example, by clamps 56 which are secured to lid 52 and engage over the flanges 46 of the shield.

In order to ensure the necessary close contact of the wall 44 of shield 43 with the surface of glass article 10, the block 48 is urged upwardly toward lid 52, for example, by springs 57 (FIGURES 13 and 14) interposed between the bottom wall of box 47 and the bottom surface of the related block 48. By reason of the relatively yieldable character of the plastic material forming shield 43, the upward pressure of springs 57 transmitted to the glass article 10 through block 48 causes the wall 44 of the shield to conform closely to the surface of the glass article.

As conveyor belt 16 carries each box 47 mounted thereon into the housing 22 of a blasting station, the areas of the glass article 10 exposed through the openings 45 of shield 43 are subjected to compound blasts of finely divided abrasive particles issuing from the nozzles 26, arranged as hereinabove described, at the blasting station. The close contact of the wall 44 of shield 43 with the surface of the glass article 10 ensures that the areas of the glass article subjected to the abrading action of the blasts will be sharply defined.

Any desired number of such boxes 47 may be mounted on one and the same conveyor, all of which have the same shield openings $a'$, and which conveyor moves the boxes through the first blasting step as hereinabove described. A second conveyor having different boxes 47 for producing the next portion of the design has a second blasting station associated therewith. The number of conveyors, each having a multiplicity of boxes 47 for producing a given stage of the design and each having a blasting station associated therewith, will, of course, depend on the number of stages or steps of the particular design.

When each glass article is removed from a box 47 on one conveyor, for example, the conveyor 14 transporting the glass articles through the first blasting station 15, and transferred to a similar box 47 on the conveyor 29 which carries the successive glass articles through the second blasting station 30, the key or other locating member 50 removably secured on the glass article and the slots 51 in the boxes 47 ensures proper registration of the previously abraded areas of the glass article with respect to the openings of the shields 43 mounted on the boxes 47 of the second conveyor. Thus the key and slot construction facilitates rapid transfer from the boxes of one conveyor to those of the next with the articles in proper position relative to the shield after each transfer. Thus, although different shields are employed during successive blasting steps, the final design will have correctly related areas of of different depths and surface characteristics, as shown in FIGURES 8 and 9.

The process and apparatus of FIGURES 10 to 14 lends itself to mass production of three-dimensional designs at low cost. In the case of a three-part design, three conveyors, each containing a relatively large number of boxes 47, can operate concurrently so that the time interval required for the production of each article is little more than that required for the first blasting step.

Figure 15:
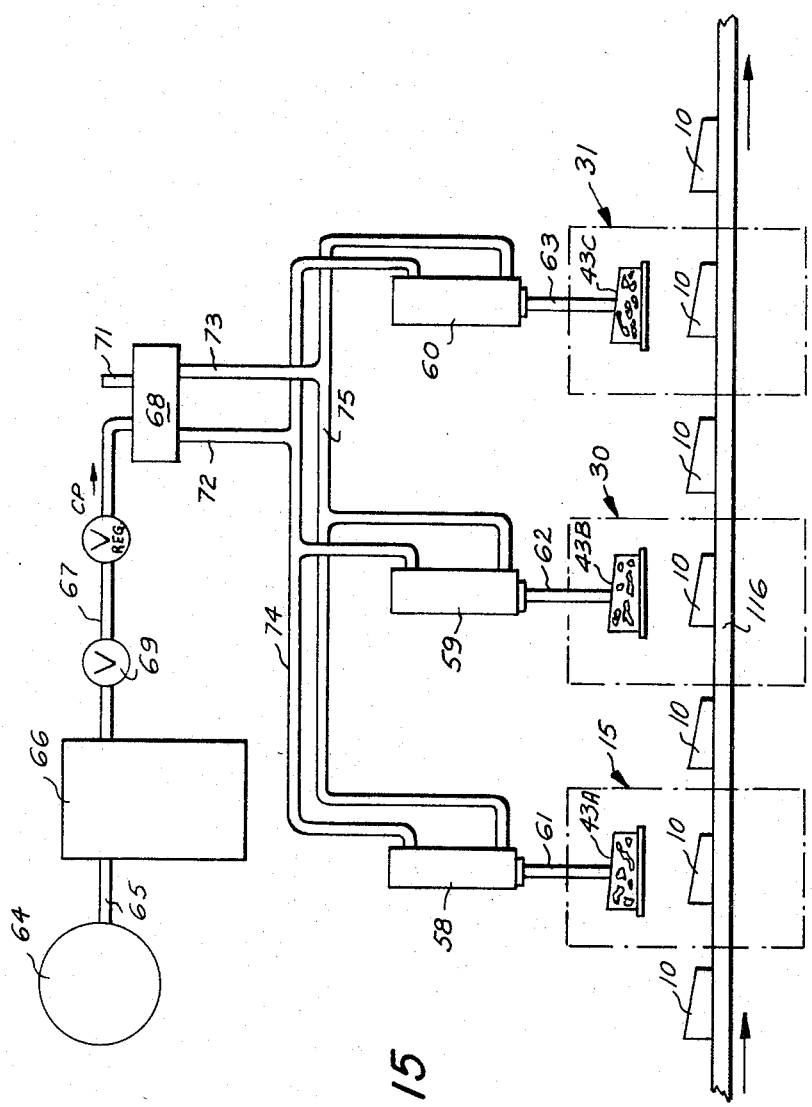
FIGURE 15 is a schematic view of equipment for applying ornamental designs to glass articles in accordance with still another embodiment of the invention.

FIGURE 15 shows apparatus, in accordance with this invention, for transporting the successive articles on a single conveyor passing through the successive blasting stations, at each of which a shield similar to shield 43 and having the desired pattern of openings therein is moved into engagement with the glass article then located at the respective blasting station so as to mask the surface of such glass article and thereby expose only those areas of the surface of the glass article which are to be subjected to blasting with finely divided abrasive particles at the respective stations, as hereinabove described, with each station provided with a plurality of blasting nozzles arranged substantially as shown in FIGURE 4.

More specifically, the arrangement shown in FIGURE 15 includes a conveyor belt 116 having spaced apart pockets for receiving the glass articles 10 and being guided for travel along a run extending successively through the blasting stations 15, 30 and 31, each of which is defined by a housing similar to that illustrated in FIGURE 4 and containing the blasting nozzles.

The conveyor belt 116 is intermittently advanced through a distance equal to the spacing between the successive glass articles thereon so that, during each period of dwell of the conveyor belt, a glass article is disposed at each of the blasting stations. The period of dwell of the conveyor is determined by the time interval required for the longest blasting step, that is, the blasting step performed at the first station 15.

Vertically arranged fluid pressure-operated cyinders 58, 59 and 60 are suitably mounted above conveyor belt 116 at blasting stations 15, 30 and 31, respectively, and have downwardly extending piston rods or rams 61, 62 and 63 to the lower ends of which shields 43A, 43B and 43C are respectively mounted. Shields 43A, 43B and 43C may be formed in the manner described above with reference to the shield 43 and have patterns of openings corresponding to the openings $a'$, $b'$ and $c'$ appearing in FIGURES 5, 6 and 7, respectively. When the piston rods or rams 61, 62 and 63 are retracted or raised, the shields 43A, 43B and 43C are elevated above the glass articles on conveyor belt 116 and the latter can then be advanced for changing the glass articles positioned at the several blasting stations. During each period of dwell of the conveyor belt, the piston rods 61, 62 and 63 are extended or lowered and thereby press the related shields 43A, 43B and 43C into close contact with the surfaces of the glass articles 10 then positioned at the respective blasting stations. When the shields are thus maintained in close contact with the glass articles at the several blasting stations, compound blasts of finely divided abrasive particles, as hereinabove described, are directed from the nozzles at each station for the previously mentioned desired intervals of time and under the indicated preferred pressures to act upon those surface areas of the glass articles disposed at the blasting stations 15, 30 and 31, which are exposed through the openings of the related shields 43A, 43B and 43C.

In order to control the operation of the fluid pressure-operated cylinders 58, 59 and 60, the arrangement illustrated in FIGURE 15 includes a source of fluid under pressure, for example, an air compressor 64 having its outlet connected through a pipe 65 to an air pressure storage tank 66 from which a compressed air supply line 67 extends to a solenoid operated distributing valve 68. A shut-off valve 69 and a pressure regulating valve 70 are preferably interposed in the supply line 67. The conventional solenoid operated distributing valve 68 has an exhaust 71 and two outlet connections 72 and 73 which are alternately communicated with the compressed air supply line 67 and the exhaust 71 through operation of valve 68. The connections 72 and 73 extend into manifolds 74 and 75 from which lines lead to the upper and lower ends, respectively, of the cylinders 58, 59 and 60 above and below the piston heads therein. Thus, when manifold 74 is connected to the compressed air supply line 67 and manifold 75 is connected to the exhaust 71, compressed air is supplied to the upper ends of the cylinders to effect downward movement of shields 43A, 43B and 43C into contact with glass articles at the respective blasting stations. Conversely, when manifold 75 is connected to the compressed air supply line 67 and manifold 74 is connected to the exhaust 71, compressed air is supplied to the lower ends of the cylinders to raise the shields out of contact with glass articles on conveyor belt 116.

From the above, it will be apparent that in the arrangement of FIGURE 15, a single shield is used at each blasting station for suitably masking the surfaces of the successive articles positioned at the related station, and the shield at the respective stations produce the respective portions of the design as hereinabove described in connection with other modifications.

It has been found that a plastic masking operation provides exceptional results when used in place of the previously described mask.

In a preferred embodiment, plastic sold by Chemical Products Corporation under the trademark CHEM-O-SOL (blend X–6994) is reduced to a molten state. The glass, or other article which is to be engraved, is heated to approximately 375° F. and then dipped into molten plastic. After a sufficient time to permit the plastic to reach a coated thickness of from 1/16" to 1/8", the coated glass is removed from the plastic and then subsequently heated or cured at approximately 350° F. until the plastic forms a smooth bubble free coating on the glass article.

Subsequently the coated glass is permitted to cool and the plastic coating removed therefrom. The plastic thus treated, retains a gripping quality so that when subsequently placed around the original glass article it forms a substantially air-tight enclosure.

A heat controlled die such as a steel rule die or an engraved die heated to approximately 200° F. is then used in a conventional manner to remove the areas a' from the plastic mask. A second mask is similarly formed with openings corresponding to the openings a' and b' etc., with a mask being formed for each required blasting operation. If desired the plastic may be heated instead of the dyes and the plastic cut while it is warm.

When it is desired to form the three dimensional object on the actual glass articles themselves, the mask wih the openings a' is placed on the glass, and, because of the compatibility or gripping properties of the plastic the mask will cling so tightly to the glass that during the blasting operation no abrasive articles will penetrate between the mask and glass. After the initial blasting operation, the plastic mask is removed and a second mask placed on the glass and the blasting again resumed. Since the openings in the second mask correspond to the openings a' and b' the process in this respect is substantially the same as that described above with respect to the drawings. If desired, further blasting operations can be continued although it has been found that for many purposes two blasting operations alone are sufficient to provide an excellent simulation of a three dimensional engraved article. This is particularly the case when during the blasting operation the edges of the unmasked areas are blasted more heavily than the central portions thereof.

Although illustrative embodiments of the invention have been described in detail herein with reference to the accompanying drawings, it is to be understood that the invention is not limited to those precise embodiments and that various changes and modifications may be effected therein without departing from the scope or spirit of the invention.

What is claimed is:
1. A process for forming three-dimensional bas-relief designs on glass articles comprising the following steps:
 (a) exposing a first series of selected areas of the glass article corresponding to the deepest portions of the desired design while covering the remaining design areas;
 (b) blasting the exposed areas with abrasive solid particles;
 (c) discontinuing said blasting and thereafter exposing, in addition to the first-mentioned series of selected areas, a second series of selected areas of the desired design which second series is of less depth than the first-mentioned series of selected areas;
 (d) blasting the glass article having both of said series of selected areas of the desired design exposed with abrasive particles; and
 (e) continuing the exposing of at least one additional series of selected areas of the desired design and the blasting of all exposed selected areas of the desired design, including the first and second exposed series of selected areas of the desired design, until the completed bas-relief design is produced, with the last blast at a pressure below the first blast so that the last blast produces the shallowest areas of the design with simultaneous abrading of the previously formed design areas to impart a frosted appearance to the design areas including the deepest design areas.

2. The process as defined in claim 1, in which the abrasive particles having an average particle size such that the longest dimension does not exceed about 125 microns, and the glass articles are subjected to three successive blasting steps of progressively decreasing duration under progressively decreasing pressures.

3. The process as defined in claim 2, in which the tnree blasting steps are carried out, with the first at a pressure of from 30 to 40 p.s.i.g. for from 10 to 20 seconds, the second at a pressure of from 10 to 15 p.s.i.g. for from 3 to 10 seconds, and the third at a pressure of from 3 to 8 p.s.i.g. for from 1 to 5 seconds.

4. A process for manufacturing a plurality of glass articles having three-dimensional bas-relief designs thereon, such designs consisting of a plurality of substantially discrete design levels, comprising:
 (a) applying a first mask having first cutout areas to said glass articles to expose a first series of selected areas of the glass article corresponding to the deepest levels of the desired design while covering the remaining design areas;
 (b) blasting the exposed areas with abrasive solid particles;
 (c) discontinuing said blasting;
 (d) removing said first mask;
 (e) thereafter applying at least one additional mask to said glass articles, said additional mask having cutout areas in addition to said first cutout areas, to thereby expose a series of selected areas in addition to said first series of selected areas, said additional areas corresponding to a level of the design shallower than said deepest levels;
 (f) blasting the glass articles having both of said series of selected areas exposed with abrasive particles, with the last-named blast producing such shallower levels of the design while simultaneously abrading the previously formed design areas, the number of successive masking and blasting steps determining the number of substantially discrete levels of the design; and
 (g) removing said additional mask.

5. A process according to claim 4, including the step of forming an airtight seal between said masks and glass articles by substantially enveloping each of the glass articles in a resilient plastic mask adapted to mate with the article whereby only the exposed portions of the glass articles are subjected to the abrasive solid particles.

6. A process according to claim 4, including the step of blasting the edges of at least some of the exposed areas with greater force than the center portion of such areas.

References Cited

UNITED STATES PATENTS

| | | | |
|---|---|---|---|
| 203,395 | 5/1878 | Whittaker | 51—262 |
| 394,612 | 12/1888 | Ripley | 51—310 |
| 1,207,972 | 12/1916 | Miksch et al. | 51—312 |
| 1,667,309 | 4/1928 | Chase | 51—312 |
| 1,720,569 | 7/1929 | Philip | 51—312 |
| 1,867,856 | 7/1932 | McCrery | 51—14 |
| 2,022,587 | 11/1935 | Cunningham | 51—310 X |
| 2,277,937 | 3/1942 | Shryer | 51—310 |
| 2,327,019 | 8/1943 | Chruma | 51—312 |
| 2,348,335 | 5/1944 | Escher | 51—262 |
| 2,482,034 | 9/1949 | Stevens | 51—14 |
| 2,617,225 | 11/1952 | O'Brien | 51—310 |
| 2,671,978 | 3/1954 | Brusetti | 51—312 |

LESTER M. SWINGLE, *Primary Examiner.*